United States Patent Office 3,361,706
Patented Jan. 2, 1968

3,361,706
CONTROL OF THE PHOTOCHROMIC RETURN RATE OF (ARYLAZO)THIOFORMIC ARYLHYDRAZIDATES
Lewis Smith Meriwether, Stamford, Conn., and Edith Clara Breitner, Kew Gardens, and Carol Louise Sloan, Yonkers, N.Y., assignors to American Cyanamid Company, Stamford, Conn., a corporation of Maine
No Drawing. Filed Mar. 6, 1964, Ser. No. 350,082
4 Claims. (Cl. 260—39)

ABSTRACT OF THE DISCLOSURE

This invention relates to a process for controlling the photochromic reaction rate of various (arylazo)thioformic arylhydrazidates by adding an acid or basic material thereto. The invention also relates to the arylhydrazidates having the acidic or basic material intimately blended therewith and to thermoplastic polymers having the intimate mixture of hydrazinate and acidic or basic material intimately dispersed throughout the body thereof.

---

Photochromic compounds and compositions are well known in the art, as is the usage thereof in such applications as temporary or permanent data storage devices, reflectants for high intensity radiation, window glass, sunglasses and the like. These photochromic compounds or compositions generally become colored or change color upon subjection to visible or ultraviolet light and then revert to their original color when they are removed from the ultraviolet or visible light and/or stored in the dark. Additionally, many of these known compositions change color even when exposed to ordinary sunlight and subsequently revert back to their original color upon removal from the rays of the sun. Various other materials change color only when subjected to a certain wavelength of irradiation and revert to their original color only when subjected to a second wavelength of irradiation.

One problem, for which a solution is continually being sought in regard to these photochromic compositions, is the slow return rate of the photochromic materials now commercially available. That is to say, in order for a photochromic system to be highly effective in many applications, the most critical feature resides in the return rate of the photochromic additive, i.e. the length of time which elapses during the change of the composition from the state which prohibits the passage of certain wavelengths of light therethrough to the state which permits the passage of such light therethrough. Slow return rates, therefore, materially decrease the scope of useful applications for which the composition may be used. Furthermore, it can readily be seen that a composition or compound which has rapid return rate is essential for the welfare of the user in regard to such articles as sunglasses, windshields, and the like wherein the color change of the photochromic compound must be virtually instantaneous.

To this end, we have now found a novel process for the regulation and control of the photochromism of (arylazo)thioformic arylhydrazidates, particularly in regard to the return rate thereof. More particularly, we have found that the return rates of (arylazo)thioformic arylhydrazidates may be regulated, i.e. materially increased by the incorporation therein of acidic or basic materials. Furthermore, and perhaps more importantly, we have found that it is now possible to control the rate of return of (arylazo)thioformic arylhydrazidates, not only in solution, but also in the solid state, e.g. after having been incorporated in a thermoplastic substrate. Since the return rate of photochromic systems is generally slower in solid media than in solution, the use of our process now enables the application of (arylazo)thioformic arylhydrazidate photochromic systems to many fields where they were previously inoperable.

It is therefore an object of the present invention to provide a novel group of photochromic compositions.

It is a further object of the present invention to provide a novel group of photochromic compositions characterized by their rapid return rate, comprising (arylazo)thioformic arylhydrazidates having intimately intermingled therewith an acidic or basic material and resinous compositions containing said photochromic compositions.

It is a further object of the present invention to provide a novel process for the regulation or control of the photochromic return rate of (arylazo)thioformic arylhydrazidate photochromic systems.

These and other objects will become more apparent to one skilled in the art upon reading the more detailed description of our invention set forth hereinbelow.

As mentioned above, we have now found that the photochromic return rates of (arylazo)thioformic arylhydrazidates can be controlled by our novel procedure. The (arylazo) thioformic arylhydrazidates which are useful in the present invention, i.e. can be controlled according to our novel method, are those having the formula

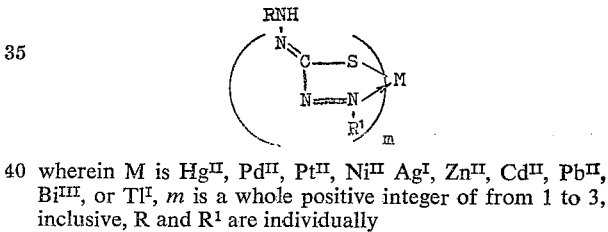

wherein M is $Hg^{II}$, $Pd^{II}$, $Pt^{II}$, $Ni^{II}$, $Ag^I$, $Zn^{II}$, $Cd^{II}$, $Pb^{II}$, $Bi^{III}$, or $Tl^I$, $m$ is a whole positive integer of from 1 to 3, inclusive, R and $R^1$ are individually

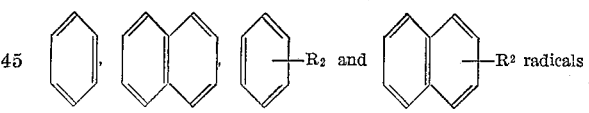

and $R^2$ represents alkyl $(C_1–C_4)$, alkoxycarbonyl $(C_2–C_6)$, aryl $(C_6–C_{10})$, nitro, sulfamoyl, sulfo, halo, arylamino $(C_6–C_{10})$, alkoxy $(C_1–C_4)$, alkylamino $(C_1–C_4)$, aryloxy $(C_6–C_{10})$, amino, acyl $(C_2–C_{11})$, hydroxy, acylamino $(C_1–C_{11})$, carboxyaryl $(C_7–C_{11})$, carboxyalkyl $(C_2–C_4)$, tetralyl, perfluoroalkylthio $(C_1–C_4)$, or alkylthio $(C_1–C_4)$ radicals.

These compounds are relatively new in the art and a method for their preparation can be found in copending U.S. application, Ser. No. 323,580 to Meriwether et al., filed Nov. 14, 1963. The compounds undergo a variety of color changes upon subjection to visible light of wavelengths of about 4000 to about 8000 angstroms and revert to their original state when removed from said light. They are colored solids, melting in the range of from about 150° C. to 350° C. and are moderately soluble in common organic solvents and are insoluble in water.

According to our invention, the return rate of these materials can be controlled or regulated by adding thereto, intimately blending or otherwise contacting them with an acidic or a basic material. By the term "acidic or basic material," as used in the instant specification, is meant such materials which, when contacted with an aqueous system, produce a system of non-neutral pH. We have found that generally any acidic or basic material can be used in our novel procedure, the relative effectiveness thereof depending upon the amount of and the degree of acidity or basicity of the material added, however, a preferred group of compounds which we have found to be effective in our novel process are the Brønsted acids or bases. Compounds of this class are generally identified as materials which are proton donors or acceptors. Such acids and bases are well known in the art and are more specifically defined and set forth in L. P. Hammett, "Physical Organic Chemistry," McGraw-Hill, New York, 1940.

As examples of acidic or basic materials suitable for the practice of this invention, the following are illustrative: hydrochloric acid, hydrofluoric acid, sulfuric acid, phosphoric acid, ammonium chloride, alum, boric acid, perchloric acid, nitric acid, formic acid, acetic acid, propionic acid, butyric acid, capric acid, oleic acid, palmitic acid, stearic acid, succinic acid, glutaric acid, maleic acid, fumaric acid, acrylic acid, benzoic acid, naphthoic acid, phthalic acid, phenol, cresol, resorcinol, acetoacetic ester, glycine, alanine, glutamic acid, nitromethane, salicylic acid, cyclohexane carboxylic acid, chloroacetic acid, dichloroacetic acid, trichloroacetic acid, citric acid, lactic acid, tartaric acid, oxalic acid, sulfanilic acid, benzene sulfonic acid, ethylenediaminetetraacetic acid, sodium hydroxide, potassium hydroxide, ammonium hydroxide, magnesium hydroxide, calcium hydroxide, barium hydroxide, sodium bicarbonate, sodium carbonate, sodium borohydride, sodium metasilicate, trisodium phosphate, calcium carbonate, sodium borate, methylamine, dimethylamine, trimethylamine, ethylamine, triethylamine, propylamine, butylamine, octylamine, aniline, methylaniline, dimethylaniline, naphthylamine, ethylene, diamine, diethylene triamine, tetramethylenediamine, hexamethylene diamine, hydrazine, pyridine, picoline, lutidine, collidine, benzylamine, toluidine, aminobenzoic acid, lysine, glutamine, histidine, arginine, guanine, guanidine, phenylene diamine, sodium acetate, sodium benzoate, sodium glutamate, and the like.

The foregoing list is not by any means inclusive of all the acidic or basic materials useful herein and it should be understood that many other such materials can be utilized provided they come within the definitions set forth hereinabove as applicable materials.

The acidic or basic materials, according to our invention, may be used in admixture with each other, as solutions or as pure materials and are added to the (arylazo)thioformic arylhydrazidates in what may be termed "catalytic amounts." This is to say, inasmuch as there is a transformation which occurs during the photochromic process of the (arylazo)thioformic arylhydrazidate, which reaction is catalyzed by the acidic or basic material, amounts which enable the material to so function, may be used. Generally however, we have found that amounts ranging from about 0.001 to about 10.0%, by weight, based on the total weight of the system, can be employed. The preferred amount ranges from about .01 to about 1.0%, by weight. Generally, the more acidic or basic material which is added, the faster the return rate of the (arylazo)thioformic arylhydrazidate. That is to say, a small amount of the added acidic or basic material will affect the reutrn rate of the (arylazo)thioformic arylhydrazidate minimally and a large amount will cause a greater increase in the return rate. The catalyzed reaction occurs at room temperature or temperatures as low as −80° C. or as high as 100° C. at subatmospheric, superatmospheric and atmospheric pressure.

As mentioned above, our novel compositions, i.e. the (arylazo)thioformic arylhydrazidate-acidic or basic material mixture can be incorporated into a solid resinous medium which may then be used to produce such articles as films, sheets, coatings and the like which articles will then also exhibit an increased return rate over the resin compositions containing the (arylazo)thioformic arylhydrazidate alone. Examples of polymeric materials to which our novel compositions may be added are those which are set forth in the copending application mentioned above, in particular, such materials as acrylic and methacrylic polymers, styrene polymers, vinyl halide polymers, i.e., the vinyl-type thermoplastic polymers, cyanoethylated cellulosic materials, aminoplast resins, polyester resins, melamine-formaldehyde reaction products, cellulose acetate polymers such as acetate butyrate, etc., nitrocellulose, cured epoxy polymers and the like may be used. The resultant compositions of matter may be formed into various shapes or articles such as discs, plates, films and the like by any known technique and still exhibit the increased photochromic return rate.

The amount of photochromic system added to the polymer, that is the (arylazo)thioformic arylhydrazides in admixture with the return rate controlling additive, is not critical and depends upon the intensity of the color of the resin composition desired upon irradiation thereof. Generally, however, an amount of photochromic composition or system ranging from about 0.001% to about 10%, by weight, preferably about 0.01% to about 1.0%, by weight, based on the weight of the resinous polymer, may be used. Physical blending of the polymeric media and the photochromic additive may be conducted by any known procedure such as by utilizing a ball mill, a tumbler mixer, hot rolls, emulsion blending techniques, Banbury mixers, Waring Blendors, devolatilization-extrusion mechanisms and the like, the manner of incorporation forming no part of the instant invention. Of course, the photochromic composition must be compatible with the resinous polymer and must be capable of being retained in the polymer for relatively long periods of time. Generally, however, every system possesses this ability.

The novel resinous compositions of this invention may be further modified with such compatible materials as fillers, lubricants, plasticizers, colorants, dyes, ultraviolet absorbers and the like without departing from the scope of our invention.

The photochromic polymeric compositions of the present invention may be utilized for such applications as variable transmission windows, data processors, communication devices, advertising, sunglasses, automobile windshields, toys, novelties, military applications and the like.

The following examples are set forth for purposes of illustration only and are not to be construed as limitations on the present invention except as set forth in the appended claims. All parts and percentages are by weight unless otherwise specified.

*Example 1*

300 parts of an orange $10^{-5}$ M solution of bis[(phenylazo)thioformic acid 2-phenylhydrazidato]Hg(II) in benzene are divided into four equal parts. The first is irradiated with a 100-watt tungsten projector lamp at room temperature. The color of the solution changes to royal blue through a gray intermediate shade in two seconds. Away from the light, the orange color returns completely in about 60 seconds. Two parts of pyridine are added to the second solution, which is then irradiated as above. The blue color develops in five seconds, but return in the dark is much faster, being complete in five seconds. To the third portion of the initial solution is then added three parts of pyridine. Upon irradiation, the orange solution turns blue in about six seconds. When the source of irradiation is removed, the orange color returns in two seconds. Four parts of pyridine are added to the fourth portion. Under irradiation, this solution fails to exhibit any color change visible to the naked eye. Irradiation of the fourth portion at 10° C. produces the intermediate gray color which returns to orange in one second on removal from the light source.

Example 2

One hundred parts of an orange $10^{-4}$ M solution of tris[(phenylazo)thioformic acid 2-phenylhydrazidato]Bi-(III) in $CH_2Cl_2$ are divided in half and a 0.5 part of triethylamine is added to one fraction. Irradiation of the untreated fraction with a tungsten lamp at $-80°$ C. causes the solution to become gray. The solution changes back to orange on removal from the light in about 45 seconds. Irradiation of the fraction containing the amine under the same conditions changes the color to gray and the solution reverts to orange in 15 seconds upon removal of the light source.

Example 3

One hundred parts of a green $CH_2Cl_2$ solution $10^{-5}$ M in bis[(phenylazo)thioformic acid 2-phenylhydrazidato]-Pd(II) are divided equally. The portion is treated with 0.5 part of a $10^{-3}$ M solution of 2,6-lutidine in $CH_2Cl_2$, and both portions are irradiated at $-40°$ C. as in Example 2. The untreated portion turns orange and reverts to green in 30 seconds. The treated portion also turns orange but reverts to green in two seconds.

Following the procedure of Example 3, additional experiments were conducted utilizing various hydrazidates and various basic or acidic materials according to the instant invention. The results of these runs are set forth hereinbelow in Table I.

Example 53

One hundred parts of a benzene solution of poly (methyl methacrylate) (20% solids) and 10 parts of a mixture of bis[(phenylazo)thioformic acid 2-phenylhydrazidato]Hg(II) and pyridine (300:2) (produced as in Example 1) are drawn down on a glass plate and allowed to set for 5 hours to remove the benzene. A second solution of 100 parts of poly(methyl methacrylate) (20% solids) in benzene and 10 parts of the same hydrazidate are also drawn down on a glass plate and allowed to set forth the same length of time. The first film is an orange color and turns to blue upon irradiation at room temperature with a 100-watt projector. The film returns to orange upon removal of the projector in 2000 seconds. Treatment of the second film in the same manner results in a return rate of the film from blue to orange in 9000 seconds.

Example 54

Following the procedure of Example 53, except that 100 parts of a methylene chloride solution of polystyrene are used, the return-rate of the hydrazidate-pyridine treated film is 1250 while that of the hydrazidate film is 8600.

Example 55

Again following the procedure of Example 53, 100 parts of poly(vinyl chloride) solution containing the

TABLE I

| Ex. | (arylazo)thioformic arylhydrazidate | | M | m | Acidic or Basic Material | Pts. | T °C. | Return Rate, seconds | |
|---|---|---|---|---|---|---|---|---|---|
| | R | R' | | | | | | T[1] | NT[2] |
| 4 | Phenyl | Phenyl | Hg | 2 | Acetic acid | 1 | 10 | 10 | 60 |
| 5 | do | do | Pt | 2 | do | 1 | 25 | 1 | 2 |
| 6 | do | do | Ag | 1 | 2,6-lutidine | 1 | 10 | 5 | 50 |
| 7 | do | do | Pb | 2 | Aqueous $NH_4OH$ | 1 | -80 | 0.1 | 1 |
| 8 | do | do | Zn | 2 | Aqueous HCl | 0.5 | 25 | 1 | 2 |
| 9 | do | do | Tl | 1 | $NH_4Cl$ | 0.25 | -80 | 0.1 | 1 |
| 10 | do | do | Ni | 2 | Stearic acid | 0.5 | -80 | <0.1 | 0.5 |
| 11 | do | do | Cd | 2 | Acrylic acid | 1 | -80 | <0.1 | 0.5 |
| 12 | p-Methyl phenyl | p-Methyl phenyl | Pt | 2 | Benzoic acid | 0.5 | 10 | 1 | 3 |
| 13 | m-Benzamidophenyl | m-Benzamidophenyl | Bi | 3 | Phthalic acid | 1 | -80 | 5 | 40 |
| 14 | 2-Methoxycarbonyl-1-naphthyl | 2-Methoxycarbonyl-1-naphthyl | Pb | 2 | Aniline | 0.5 | -80 | 0.5 | 2 |
| 15 | m-Sulfamoylphenyl | m-Sulfamoylphenyl | Hg | 2 | Glutamic acid | 0.75 | 10 | 15 | 60 |
| 16 | do | 1-naphthyl | Tl | 1 | Aqueous trisodium phosphate. | 0.2 | -80 | 0.2 | 1 |
| 17 | p-Chlorophenyl | do | Ni | 2 | Aqueous sodium hydroxide | 0.5 | -80 | <0.1 | 0.4 |
| 18 | p-Formamidophenyl | p-Formamidophenyl | Pb | 2 | Guanidine | 1 | -80 | 0.1 | 1 |
| 19 | o-n-Butyl phenyl | o-n-Butyl phenyl | Zn | 2 | Triethylamine | 1 | 10 | 1 | 5 |
| 20 | 2-carboxypentyl-1-naphthyl | 2-carboxypentyl-1-naphthyl | Cd | 2 | Dimethylamine | 0.5 | -80 | <0.1 | 0.3 |
| 21 | o-Sulfophenyl | o-Sulfophenyl | Ag | 1 | Benzene sulfonic acid | 1 | 25 | 3 | 20 |
| 22 | p-Anilinophenyl | p-Anilinophenyl | Pd | 2 | Benzylamine | 1 | 10 | 0.5 | 10 |
| 23 | do | 3-bromo-2-naphthyl | Tl | 1 | Phenol | 0.2 | -80 | 0.2 | 1 |
| 24 | 2-methyl-1-naphthyl | 2-methyl-1-naphthyl | Bi | 3 | Chloroacetic acid | 1 | -40 | 1 | 20 |
| 25 | 3-nitro-1-naphthyl | 3-nitro-1-naphthyl | Hg | 2 | Sodium glutamate | 1 | 25 | 5 | 40 |
| 26 | m-Carbamidophenyl | m-Carbamidophenyl | Ni | 2 | Lactic acid | 0.25 | -80 | <0.1 | 0.5 |
| 27 | o-Methoxyphenyl | o-Methoxyphenyl | Bi | 3 | Ethylene diamine | 0.5 | 0 | 1 | 10 |
| 28 | p-Methylaminophenyl | do | Cd | 2 | Hexamethylene diamine | 1 | -80 | <0.1 | 0.5 |
| 29 | do | o-Aminophenyl | Bi | 3 | Aminobenzoic acid | 0.5 | -40 | 5 | 20 |
| 30 | p-Naphthamidophenyl | p-Naphthamidophenyl | Pd | 2 | Aqueous $H_2SO_4$ | 1 | -80 | 5 | 60 |
| 31 | p-Methylthiophenyl | p-Methylthiophenyl | Hg | 2 | Cresol | 0.5 | 25 | 20 | 75 |
| 32 | p-Methoxycarbonyl phenyl | p-Methoxycarbonyl phenyl | Pt | 2 | Phenylene diamine | 0.5 | 10 | 0.3 | 4 |
| 33 | p-Carboxymethyl phenyl | p-Carboxymethyl phenyl | Pb | 2 | Magnesium hydroxide solution. | 0.5 | -80 | 0.2 | 1 |
| 34 | do | 1-butylamino naphthyl | Ni | 2 | Aqueous phosphoric acid | 1 | -80 | <0.1 | 0.5 |
| 35 | 3-amino-2-naphthyl | 3-amino-2-naphthyl | Tl | 1 | Succinic acid | 0.1 | -80 | 0.2 | 1 |
| 36 | m-Hydroxy phenyl | m-Hydroxy phenyl | Zn | 2 | Naphthyl amine | 1 | -40 | 1 | 10 |
| 37 | 4-n-butyl-2-naphthyl | 4-n-butyl-2-naphthyl | Hg | 2 | Aqueous sol. of alum | 0.5 | 10 | 5 | 30 |
| 38 | m-Carboxyphenyl | m-Carboxyphenyl | Ag | 1 | Aqueous $Ca(OH)_2$ | 2 | -40 | 10 | 100 |
| 39 | p-Nitrophenyl | do | Pd | 2 | Oxalic acid | 1 | -40 | 5 | 30 |
| 40 | p-Benzoylphenyl | p-Benzoylphenyl | Pb | 2 | Aqueous sodium benzoate | 0.25 | -80 | 0.2 | 1 |
| 41 | 4-sulfo-1-naphthyl | 4-sulfo-1-naphthyl | Pt | 2 | Resorcinol | 1 | 0 | 1 | 10 |
| 42 | 2-(perfluorobutylthio)-1-naphthyl | 2-(perfluorobutylthio)-1-naphthyl | Pd | 2 | Aqueous KOH | 1 | -40 | 2 | 30 |
| 43 | 4-biphenylyl | 4-biphenylyl | Ni | 2 | Boric acid | 0.5 | -80 | <0.1 | 0.3 |
| 44 | m-Pentoxycarbonyl phenyl | do | Ag | 1 | $CaCO_3$ sol | 2 | 0 | 5 | 75 |
| 45 | 2-hydroxy-1-naphthyl | 2-hydroxy-1-naphthyl | Zn | 2 | Aqueous sodium bicarbonate. | 1 | -80 | 5 | 25 |
| 46 | 2-sulfamoylnaphthyl | 2-sulfamoylnaphthyl | Bi | 3 | Methyl aniline | 1 | -10 | 1 | 15 |
| 47 | 2-butoxy-1-naphthyl | 2-butoxy-1-naphthyl | Pb | 2 | Picoline | 0.25 | -80 | 0.3 | 1 |
| 48 | 3-pentoxycarbonyl-2-naphthyl | 3-pentoxycarbonyl-2-naphthyl | Hg | 2 | Hydrazine | 0.5 | 10 | 12 | 60 |
| 49 | p-Tetralyl phenyl | p-Tetralyl phenyl | Cd | 2 | Maleic acid | 1 | -80 | <0.1 | 0.5 |
| 50 | do | p-Phenoxyphenyl | Zn | 2 | Nitro methane | 0.5 | -40 | 2 | 12 |
| 51 | 3-formamido-1-naphthyl | 3-formamido-1-naphthyl | Pt | 2 | Tetramethylene diamine | 1 | -80 | 1 | 19 |
| 52 | 6-butylthio-1-naphthyl | 6-butylthio-1-naphthyl | Tl | 1 | Butyric acid | 1 | -80 | <0.1 | 1 |

[1] Treated with acidic or basic material.  [2] Not treated.

mercury hydrazidate alone and 100 parts of the same polymer containing hydrazidate-pyridine additive are drawn down on glass. Upon treatment of each resultant film with irradiation at 25° C., the first film reverts to its original orange color in 5400 seconds while the second film turns from blue to orange in 100 seconds.

*Example 56*

One hundred parts of a powdery, commercially available cyanoethylated cellulose (nitrogen content—12%; degree of substitution—2.7) and one part of tris[(phenylazo)thioformic acid 2-phenylhydrazidato]Bi(III) are added to a ball mill mixer and mixed for 30 minutes. The resultant mixtuer is dissolved in acetone and a film of the solution is drawn down on a glass plate. Upon irradiation of the resultant orange film it becomes grayish violet. The film returns to orange upon removal of the irradiation in about 55 seconds. When a second film is produced using a mixture of the bismuth hydrazidate and 0.1 part of triethylamine, the return rate of the resultant film is 8 seconds.

*Example 57*

Into a suitable reaction vessel are added 400 parts of acrylonitrile and 15 parts of sodium hydroxide. To this mixture is added 50 parts of water and 0.35 part of isopropyl naphthalene sodium sulfonate, as an emulsifier. The resultant mixture is agitated for 30 minutes and 25 parts of white cotton yarn are then added. The temperature is raised to 38° C. and the reaction mixture is thoroughly agitated for one hour. The sodium hydroxide is neutralized with phosphoric acid and the yarn is washed with water. Its nitrogen content is 13.2% and the degree of substitution is 2.8. The yarn is then divided into two equal portions. To one of these portions is added a solution of 15 parts of bis[(phenylazo)thioformic acid phenylhydrazidato]Pd(II) in $CHCl_3$. To the second portion is added the same amount of the same hydrazidate, but which has been mixed with 0.1 part of a $CH_2Cl_2$ solution of 2,6-lutidine. The first yarn portion is green, turns to orange when subjected to irradiation and reverts to orange in 150 seconds when the irradiation source is removed. The second portion of yarn has a return-rate of 15 seconds.

*Example 58*

To 100 parts of a powdered, commercially available, spray-dried melamine-formaldehyde resin (mole ratio 1:2) is added 1.0 part of mono[(phenylazo)thioformic acid 2-phenylhydrazidato]Ag(I). The mixture is then thoroughly mixed in a ball mill for ½ hour. A saucer-shaped plate is molded from the resultant blend by heating it in a mold at 155° C. for 5 minutes. The yellow saucer turns purple upon irradiation at 25° C. and reverts to yellow in 50 seconds when removed from the source of irradiation. When a mixture of the silver hydrazidate and 0.01 part of an aqueous solution of calcium hydroxide is used, however, the return-rate of a saucer from purple to yellow is 6 seconds.

*Example 59*

To 100 parts of a sodium carbonate-washed, commercially available polyester resin (maleic anhydride; phthalic anhydride; propylene glycol—15.1; 46.2; 38.7) is added 1.0 part of bis[(phenylazo)thioformic acid 2-phenylhydrazidato]Pb(II). One hundred parts of styrene are added and the resultant mixture is heated at 90° C. for fifteen hours between glass plates. The resultant casting turns from orange to gray upon contact with irradiation. It returns to its original color in 18 seconds. When the lead hydrazidate is employed in admixture with 0.01 part of aqueous ammonium hydroxide, the return rate of the resultant casting is 2 seconds.

Following the procedures of Examples 53–59, the specific procedure in each instance being governed by the specific polymeric media employed, various photochromic hydrazidate-additive mixtures, produced as hereinbefore described, are added to various polymers. The results of each experiment at room temperature, unless otherwise specified, is set forth hereinbelow in Table II.

Table II

| Ex. | (Arylazo)thioformic arylhydrazidate-acidic or basic material mixture of Example No. | Percent | Polymer Medium of Ex. No. | Return Rate, sec. | |
|---|---|---|---|---|---|
| | | | | Hydrazidate alone | HABM |
| 60 | 5 | 1.0 | 53 | 15 | 3 |
| 61 | 16 | 1.0 | 59 | *5 | *1 |
| 62 | 8 | 1.0 | 55 | 15 | 1 |
| 63 | 26 | 1.0 | 54 | *3 | *0.5 |
| 64 | 21 | 0.5 | Ca | 60 | 8 |
| 65 | 12 | 0.5 | 56 | 10 | 1 |
| 66 | 11 | 1.2 | 53 | 15 | 1 |
| 67 | 19 | 1.5 | 55 | 8 | 0.5 |
| 68 | 15 | 1.0 | 59 | 160 | 10 |
| 69 | 9 | 5.0 | 53 | *5 | *0.1 |
| 70 | 24 | 3.0 | 56 | *110 | *5 |
| 71 | 10 | 1.0 | 54 | *5 | *0.5 |
| 72 | 30 | 2.0 | 59 | 210 | 20 |
| 73 | 18 | 1.5 | 55 | 15 | 1 |
| 74 | 33 | 0.1 | Ca | 18 | 2 |
| 75 | 25 | 0.5 | 54 | 8,309 | 1,600 |
| 76 | 36 | 2.0 | 53 | 10 | 1 |
| 77 | 38 | 1.0 | 57 | 60 | 5 |
| 78 | 13 | 1.0 | 56 | *125 | *10 |
| 79 | 34 | 3.0 | 59 | *5 | *0.1 |
| 80 | 39 | 0.5 | 55 | 290 | 15 |
| 81 | 22 | 0.5 | 56 | 350 | 17 |
| 82 | 31 | 0.5 | 53 | 9,000 | 1,525 |
| 83 | 14 | 0.1 | 55 | 15 | 3 |
| 84 | 35 | 0.01 | Ca | *9 | *2 |
| 85 | 37 | 1.5 | 59 | 230 | 11 |
| 86 | 28 | 1.0 | 58 | 13 | 0.9 |
| 87 | 20 | 1.75 | 54 | 16 | 1 |
| 88 | 32 | 2.0 | 59 | 19 | 0.7 |
| 89 | 27 | 1.0 | 53 | *57 | *8 |
| 90 | 40 | 1.0 | 57 | 12 | 2.5 |
| 91 | 45 | 1.0 | 54 | 18 | 1 |
| 92 | 50 | 1.0 | 59 | 17 | 1 |
| 93 | 41 | 1.5 | 56 | 20 | 0.8 |
| 94 | 47 | 0.5 | 53 | 16 | 3 |
| 95 | 51 | 0.1 | 55 | 19 | 4 |
| 96 | 44 | 1.0 | 59 | 60 | 4 |
| 97 | 49 | 2.0 | 53 | 13 | 0.6 |
| 98 | 42 | 5.0 | 58 | 510 | 32 |
| 99 | 46 | 5.0 | 56 | *47 | *3 |
| 100 | 52 | 1.0 | 59 | *4 | *0.5 |
| 101 | 48 | 0.5 | 53 | 9,100 | 1,800 |
| 102 | 43 | 0.1 | 54 | *5 | *1 |

*At −89° C.; Ca=Cellulose acetate; HABM=hydrazidate-acetic or basic material mixture.

We claim:
1. A method for controlling the photochromic reaction rate of a compound having the formula

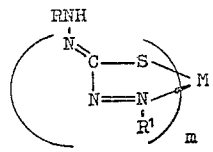

wherein M is selected from the group consisting of $Hg^{II}$, $Pd^{II}$, $Pt^{II}$, $Ni^{II}$, $Ag^{I}$, $Zn^{II}$, $Cd^{II}$, $Pb^{II}$, $Bi^{III}$, and $Tl^{I}$, $m$ is a whole positive integer of from 1 to 3, inclusive and R and $R^1$ are individually selected from the group consisting of

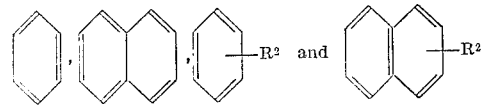

and $R^2$ is selected from the group consisting of alkyl ($C_1$–$C_4$) nitro, halo, alkoxy ($C_1$–$C_4$), aryloxy ($C_6$–$C_{10}$), hydroxy, carboxy, carboxyalkyl ($C_2$–$C_4$), alkoxycarbonyl ($C_2$–$C_6$), aryl ($C_6$–$C_{10}$), sulfamoyl, sulfo, arylamino ($C_6$–$C_{10}$), alkylamino ($C_1$–$C_4$), amino, acyl ($C_2$–$C_{11}$), acylamino ($C_1$–$C_{11}$), tetralyl, perfluorothio ($C_1$–$C_4$) and alkylthio ($C_1$–$C_4$) radicals which comprises intimately blending with said compound from about 0.001% to about 10.0%, by weight, based on the total weight of the system, of an additive selected from the group consisting of an acidic material and a basic material, said additive being a material which, when contacted with an aqueous system, produces a system of non-neutral pH.

2. A method according to claim 1 wherein the additive is selected from the group consisting of a Brønsted acid and a Brønsted base.

3. A composition of matter comprising a compound having the formula

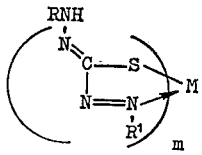

wherein M is selected from the group consisting of $Pd^{II}$, $Hg^{II}$, $Pt^{II}$, $Ni^{II}$, $Ag^{I}$, $Zn^{II}$, $Cd^{II}$, $Pb^{II}$, $Bi^{III}$, and $Tl^{I}$, $m$ is a whole positive integer of from 1 to 3, inclusive and R and $R^1$ are individually selected from the group consisting of

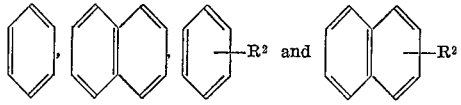

and $R^2$ is selected from the group consisting of alkyl ($C_1$-$C_4$), nitro, halo, alkoxy ($C_1$-$C_4$), aryloxy ($C_6$-$C_{10}$), hydroxy, carboxy, carboxyalkyl ($C_2$-$C_4$), alkoxycarbonyl ($C_2$-$C_6$), aryl ($C_6$-$C_{10}$), sulfamoyl, sulfo, arylamino ($C_6$-$C_{10}$), alkylamino ($C_1$-$C_4$), amino, acyl ($C_2$-$C_{11}$), acylamino ($C_1$-$C_{11}$), tetralyl, perfluorothio ($C_1$-$C_4$) and alkylthio ($C_1$-$C_4$) radicals and intimately blended therewith from about 0.001% to about 10.0%, by weight, based on the total weight of the system, of an additive selected from the group consisting of an acidic material and a basic material, said additive being a material which, when contacted with an aqueous system, produces a system of non-neutral pH.

4. A composition of matter comprising a resinous polymer selected from the group consisting of vinyl-type thermoplastic polymers, cellulose esters, cyanoethylated cellulose, cellulose, aminoplast resins, polyester resins and melamine-formaldehyde reaction products having incorporated throughout the body thereof from about 0.001% to about 10.0%, by weight, based on the weight of the resinous polymer, of a mixture comprising a compound having the formula

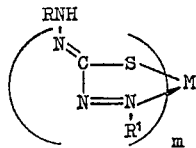

wherein M is selected from the group consisting of $Pd^{II}$, $Hg^{II}$, $Pt^{II}$, $Ni^{II}$, $Ag^{I}$, $Zn^{II}$, $Cd^{II}$, $Pb^{II}$, $Bi^{III}$, and $Tl^{I}$, $m$ is a whole positive integer of from 1 to 3, inclusive, and R and $R^1$ are individually selected from the group consisting of

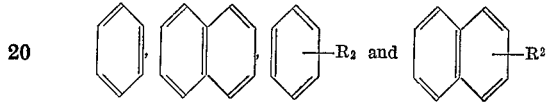

and $R^2$ is selected from the group consisting of alkyl ($C_1$-$C_4$), nitro, halo, alkoxy ($C_1$-$C_4$), aryloxy ($C_6$-$C_{10}$), hydroxy, carboxy, carboxyalkyl ($C_2$-$C_4$), alkoxycarbonyl ($C_2$-$C_6$), aryl ($C_6$-$C_{10}$), sulfamoyl, sulfo, arylamino ($C_6$-$C_{10}$), alkylamino ($C_1$-$C_4$), amino, acyl ($C_2$-$C_{11}$), acylamino ($C_1$-$C_{11}$), tetralyl, perfluorothio ($C_1$-$C_4$) and alkylthio ($C_1$-$C_4$) radicals and from about 0.001% to about 10.0%, by weight, based on the total weight of the system, of an additive selected from the group consisting of an acidic material and a basic material, said additive being a material which, when contacted with an aqueous system, produces a system of non-neutral pH.

References Cited
UNITED STATES PATENTS 2,921,407  1/1960  Wagner et al. _____ 350—160

FOREIGN PATENTS 649,852  10/1962  Canada.

ALLAN LIEBERMAN, *Primary Examiner.*